Patented Nov. 14, 1950

2,530,126

UNITED STATES PATENT OFFICE 2,530,126

2-(TERTIARY-AMINOALKYL)-2-(SUBSTITUTED-PHENYL) ETHYLAMINES

Charles Edward Kwartler, Albany, and Philip Lucas, Menands, N. Y., assignors to Sterling Drug Inc., Wilmington, Del., a corporation of Delaware No Drawing. Application June 29, 1946, Serial No. 680,524

9 Claims. (Cl. 260—570.5)

This invention relates to 2-(tert-aminoalkyl)-2-(aryl)ethylamines and to a method of preparing the same.

A large number of tert-aminoalkylamines has been described in the literature; these diamines have been used as valuable intermediates in the preparation of various pharmaceuticals, especially antimalarials. Also, there are known a few such diamines in which the alkyl residue between the tertiary and primary amine groupings is substituted by an aryl radical; but, in no instance, is the aryl radical in a beta position to the primary amine group.

We have now found that diamines having the general formula $Y=N-R-CH(Ar)CH_2NH_2$, wherein $Y=N-$ is a low molecular tert-amino group, R is an aliphatic bridge, that is, a low molecular divalent aliphatic radical, and Ar is an aromatic radical, are valuable intermediates in the synthesis of anti-infective agents such as those disclosed in our copending application Serial No. 680,523 filed June 29, 1946, and other pharmaceuticals.

In the above general formula, $Y=N-$ is a tert-amino group derived from a low molecular secamine having the general formula YNH and containing no active hydrogen atom other than the amino-hydrogen; such amines include dimethylamine, diethylamine, dipropylamine, methylbutylamine, piperidine, morpholine, and the like. In other words, $Y=N-$ is a lower dialkylamino radical in which the alkyl groups may be joined to form a heterocyclic radical of the group consisting of piperidines and morpholines. R is a low molecular divalent aliphatic radical which conveniently may be designated as an aliphatic bridge. The bridge is a chain of from two to seven atoms separating the tert-amino and the arylethylamine residues, and may contain interrupting —O—, —S—, —SO—, —SO$_2$—, or —N(alkyl)— groups. Thus, R represents such bridges as: —CH$_2$CH$_2$—, —CH$_2$CH$_2$CH$_2$—, —CH$_2$CH$_2$CH$_2$CH$_2$—, —CH$_2$CH(CH$_3$)—,

—CH$_2$CH(C$_2$H$_5$)—

—CH$_2$CH$_2$OCH$_2$CH$_2$—

—CH$_2$CH$_2$CH$_2$SCH$_2$CH$_2$CH$_2$—, and the like. Or, in other words, R is an alkylene group having 2 to 7 atoms wherein the two free valences of said alkylene group are separated by at least two contiguous carbon atoms. Ar is a 1 to 2 ringed carbocyclic aromatic radical, including phenyl, naphthyl and substituted derivatives thereof. Substituents of said aromatic radicals may include: hydrocarbon groups, such as alkyl, aralkyl, aryl, and the like; halogen atoms, such as chlorine, bromine or iodine; tert-amino groups, such as diethylamino, piperidyl, morpholinyl, and the like; ether groups, such as alkoxy, aryloxy, and the like; or other similar groups which are unaffected by treatment with strong halogenating agents, strong metalating bases, or hydrogen in the presence of hydrogenation catalysts. The aromatic radical, Ar, may also contain other substituents which must be intermediately protected during the preparation of the diamine. For example, the hydroxyl group can be intermediately protected in the form of its ether derivatives. In practicing our invention we prefer to use as the group Ar, an aromatic monocarbocyclic radical, which we define as an aromatic radical having a benzene nucleus which may bear substituents such as those indicated above.

We have further found that the diamines of the type disclosed above can be prepared by first condensing a tert-aminoalkyl halide with an arylacetonitrile in the presence of a strong metalating base, such as sodamide, followed by catalytic hydrogenation of the 1-(tert-aminoalkyl)-1-arylacetonitrile thus formed, according to the following equations.

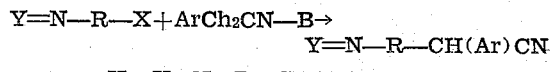
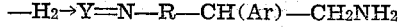

where R, $Y=N-$ and Ar have the meanings given hereinabove; X is a halogen atom such as chlorine, bromine or iodine; and B is a strong base, capable of metalating arylacetonitriles, such as alkali amides, alkali hydrides, and the like. In practicing our invention we prefer to use sodamide as the base in the alkylation because of its availability and cheapness. We found that the 1-(tert-aminoalkyl)-1-arylacetonitrile can be readily reduced to the corresponding diamine, preferably by catalytic hydrogenation. We have had especially good results when the hydrogenation is conducted in 15% methanolic ammonia in the presence of Raney nickel under 500 to 800 lbs. pressure of hydrogen at 30 to 50° C.

The following examples are presented to illustrate further our invention, but without any intention of restricting it thereto.

Example 1

(a) *3-dimethylamino-1-phenylbutyronitrile.*—
To a mixture of 72 g. of 2-dimethylaminoethyl chloride hydrochloride, dissolved in 250 ml. of water, and 150 ml. of benzene is added with cooling and stirring 45 g. of sodium carbonate. After shaking the mixture vigorously, the benzene layer is separated and dried over sodium sulfate and potassium carbonate. To the filtered benzene solution of 2-dimethylaminoethyl chloride is added 52.7 g. of phenylacetonitrile. Then 17.5 g. of sodamide is added in portions, with stirring, over a period of about 45 minutes, while maintaining the temperature at 30–40° C. during the addition. The temperature is increased gradually and kept at 75–80° C. about 1½ hours. The reaction mixture is cooled, covered with an atmosphere of nitrogen, and 200 ml. of water is added. The mixture is shaken vigorously, the benzene layer separated, dried over sodium sulfate and filtered. After the benzene has been removed in vacuo, the resulting residue is distilled in vacuo, yielding a main fraction distilling at 137–142° C. and 6 mm. This product, 3-dimethylamino-1-phenyl-butyronitrile, redistills at 130° C. and 4 mm. The hydrochloride is formed by passing hydrogen chloride into a cold ether solution of the redistilled base. After recrystallization from acetone this salt weighs about 44 g. and melts at 163–5°.

(b) *4-dimethylamino-2-phenylbutylamine.*—A solution of 25.5 g. of 3-dimethylamino-1-phenyl-butyronitrile hydrochloride in 200 ml. of 17% methanolic ammonia is hydrogenated in the presence of 20 g. of Raney nickel under 500 lbs. pressure of hydrogen at room temperature for 26 hours. After the catalyst has been filtered off and the solvent removed in vacuo, the resulting residue is distilled, yielding a main fraction of about 13 g. of 4-dimethylamino-2-phenylbutylamine distilling at 145° C. and 13 mm.

Example 2

(a) *3 - diethylamino - 1 - phenylbutyronitrile.*—This compound was reported by Eisleb (Ber. 74B, 1433–50 (1941), who gave a boiling point of 130–135° C. at 3 mm. Our product, prepared by condensing 2-diethylaminoethyl chloride with phenylacetonitrile distills at 110° C. and 0.5 mm., and forms a hydrochloride salt melting at 115–117° C.

(b) *4-diethylamino-2-phenylbutylamine.*—A solution of 64.8 g. of 3-diethylamino-1-phenyl-butyronitrile in 350 ml. of 15% methanolic ammonia is hydrogenated in the presence of 30 g. of Raney nickel for 21 hours at room temperature under 700 lbs. pressure of hydrogen. After filtering the catalyst and removing the solvent the main fraction of the residue distills at 174–6° C. and 27 mm., yielding about 61 g. of 4-diethyl-amino-2-phenylbutylamine.

Example 3

(a) *1-(4-chlorophenyl)-3-diethylaminobutyro-nitrile.*—This preparation is carried out like Example 1, but using 2-diethylaminoethyl chloride (from 129 g. of the hydrochloride), 237 ml. of benzene, 130 g. of 4-chlorophenylacetonitrile, and 29.2 g. of sodamide. After the sodamide addition, conducted over a period of 40 minutes while keeping the temperature at 40–45° C., the reaction mixture is refluxed for 5½ hours. On working up the reaction mixture as above Example 1), about 138 g. of 1-(4-chlorophenyl)-3-diethyl-aminobutyronitrile distilling about 124–6° C. and 1 mm. is obtained.

(b) *2-(4-chlorophenyl)-4-diethylaminobutyl-amine.*—This preparation is carried out like the previous hydrogenations, but using 133.5 g. of 1-(4-chlorophenyl)-3-diethylaminobutyronitrile, 500 ml. of 15% methanolic ammonia and 15 g. of Raney nickel. The resulting 2-(4-chloro-phenyl)-4-diethylaminobutylamine weighs about 118 g. and distills at 113° C. and 1 mm.

Example 4

(a) *3,4-dichlorophenylacetonitrile.*—This compound is prepared in the usual manner by refluxing a water-alcohol solution of 3,4-dichloro-benzyl chloride, sodium cyanide and a trace of sodium iodide for 4 hours. The 3,4-dichloro-phenylacetonitrile thus obtained is a colorless liquid distilling at 170° C. and 12 mm.

(b) *1-(3,4-dichlorophenyl)-3-diethylaminobu-tyronitrile.*—This nitrile is prepared in a manner similar to previous examples, but using 2-diethyl-aminoethyl chloride (from 169 g. of the hydrochloride), 310 ml. of benzene, 208 g. of 3,4-di-chlorophenylacetonitrile, and 38.2 g. of sodamide. The free base, 1-(3,4-dichlorophenyl)-3-diethyl-aminobutyronitrile, weighs about 137 g. and distills at 130° C. and 0.5 mm.

(c) *2-(3,4-dichlorophenyl)-4-diethylaminobu-tylamine.*—This hydrogenation is run like previous examples, but using 128 g. of 1-(3,4-dichlo-rophenyl)-3-diethylaminobutyronitrile, 600 ml. of 15% methanolic ammonia and 30 g. of Raney nickel. The diamine, 2-(3,4-dichlorophenyl)-4-diethylaminobutylamine, weighs about 124 g. and distills at 125° C. and 1 mm.

Example 5

(a) *3-diethylamino-1-(4-methoxyphenyl)bu-tyronitrile.*—This alkylation is run like previous examples, but using 2-diethylaminoethyl chloride (from 165 g. of the hydrochloride), 300 ml. of benzene, 161 g. of 4-methoxyphenylacetonitrile, and 37.6 g. of sodamide. The basic nitrile, 3-diethylamino-1-(4-methoxyphenyl)butyronitrile, distills at 120° C. and 0.5 mm. and weighs about 142 g.

The corresponding 4-benzyloxyphenyl- derivative can be prepared in a similar manner using 4-benzyloxyphenylacetonitrile in place of 4-methoxyphenylacetonitrile. About 79 g. of 1-(4-benzyloxyphenyl) - 3 - diethylaminobutyroni-trile, distilling about 192° C. at 1 mm., is obtained from 113 g. of 4-benzyloxyphenylacetonitrile.

(b) *4-diethylamino-2-(4-methoxyphenyl)bu-tylamine.*—This hydrogenation is run like previous examples, but using 180 g. of 3-diethyl-amino-1 - (4 - methoxyphenyl)butyronitrile, 650 ml. of 15% methanolic ammonia and 30 g. of Raney nickel. The crude product is carefully fractionated in vacuo, with the desired fraction of about 34 g. of 4-diethylamino-2-(4-methoxy-phenyl)-butylamine distilling at 133–6° C. and 1 mm.

The corresponding 4-benzyloxyphenyl- derivative can be prepared in a similar manner using 1 - (3-benzylophenyl) - 3 - diethylaminobutyro-nitrile instead of 3-diethylamino-1-(4-methoxy-phenyl)butyronitrile. About 160 g. of 2-(4-benzyloxyphenyl) - 4 - diethylaminobutylamine, distilling about 194° C. at 2 mm., is obtained from 213 g. of the corresponding nitrile.

4 - diethylamino - 2 - (4 - hydroxyphenyl)bu-tylamine, distilling about 192–4° C. at 2 mm., can be prepared by treatment of 2-(4-benzyloxy-phenyl)-4-diethylaminobutylamine at 50° C. with 50 lbs. pressure of hydrogen in the presence of palladium chloride and charcoal.

Example 6

(a) *1 - (4 - chlorophenyl) - 4 - diethylamino-valeronitrile.*—To a solution of 75 g. of 3-diethyl-aminopropyl chloride and 87 g. of 4-chlorophen-ylacetonitrile in 150 ml. of benzene is added in portions over a period of 45 minutes 20 g. of soda-mide while keeping the temperature at 40–50° C. with external cooling when necessary. The mixture is then heated to reflux for 5 hours, cooled and covered with nitrogen. After water is added and the mixture is shaken vigorously, the benzene layer is separated and extracted with 10% hydrochloric acid. The acidic extract is washed with ether, made alkaline to phenolphthalein with sodium hydroxide solution, and extracted with ether. The ether extract is washed with water and saturated sodium chloride solution, and dried over potassium carbonate. After removal of the ether in vacuo, the main fraction, comprising 1-(4-chlorophenyl) - 4 - diethylaminovaleronitrile and weighing about 88 g., distills at 138–9° C. and 0.5 mm.

(b) *2-(4-chlorophenyl) - 5 - diethylaminopentylamine.*—This hydrogenation is carried out like previous examples, but using 87 g. of 1-(4-chlorophenyl) - 4 - diethylaminovaleronitrile, 25 g. of Raney nickel and 600 ml. of 15% methanolic ammonia. The 2-(4-chlorophenyl) - 5 - diethylaminopentylamine distills at 123–4° C. and 0.5 mm. and weighs about 75 g.

Instead of using the particular arylacetonitriles mentioned hereinabove, a thienylacetonitrile, a pyridylacetonitrile, a naphthylacetonitrile, or other arylacetonitriles may be employed, thereby obtaining the corresponding 2-(tert-aminoalkyl)-2-(aryl) ethylamine.

Also, instead of using the particular tert-aminoalkyl halide mentioned hereinabove, other tert-aminoalkyl halides, such as 3-piperidylpropyl bromide, 4 - morpholinylbutyl chloride, 3 - (N-methyl-N-isobutylamino)propyl iodide, 2-(3-dimethylaminopropylthio) ethyl chloride, 2 - (2-diethylaminoethoxy)-ethyl chloride, 5-diethylaminopentyl chloride, and the like may be employed.

The diamines of the present invention contain one primary and one tertiary amino group, and these respective groups can be converted into various derivatives by suitable adaption of general procedures.

Thus, the primary amino group (H₂N—) of the diamines is converted into a ureido group (NH₂CONH—) by heating to 90–95° C. an aqueous solution containing the diamine and a slight excess over theory of nitrourea until evolution of gas ceases. In this fashion 4-diethylamino-2-phenylbutylamine gives 4-diethylamino-2-phenyl-1-ureidobutane, M. P. 83–4° C.

Again, the primary amino group (H₂N—) of the diamines is converted into the guanido group (NH₂C(=NH)NH—) by heating an aqueous mixture containing equimolecular quantities of a diamine and an S-methylisothiourea salt (e. g. sulfate, hydroiodide, etc.) until the evolution of gas (methanethiol) ceases. In this fashion, 4-diethylamino - 2 - phenylbutylamine yields 4 - diethylamino-1-guanido-2-phenylbutane sulfate, M. P. 146° C. (turns vitreous at a lower temperature) and 4-diethylamino - 1-guanido-2-phenylbutane hydroiodide monohydrate, M. P. 91–3° C., 4-diethylamino - 2 - (4-chlorophenyl) butylamine yields 4-diethylamino - 1-guanido - 2-(4-chlorophenyl) butane hydroiodide, M. P. 93–5° C., and 4-diethylamino-2-(3,4-dichlorophenyl) butylamine yields 4-diethylamino-1-guanido - 2-(3,4-dichlorophenyl)butane hydroiodide monohydrate, M. P. 122–3° C.

The 2-(tert-aminoalkyl) - 2-(aryl) ethylamines of the present invention are suitable for use as chemical intermediates for the synthesis of antiinfective agents and other pharmaceuticals either in the form of the free bases, or the salts thereof with inorganic or organic acids. Hence, it will be understood that the free bases and the salts thereof are equivalents with respect to the instant invention. The term, 2 - (tert-aminoalkyl) - 2 - (aryl) ethylamine, as used in the appended claims, will therefore be understood to include, not only the free base, but also a salt of the free base with an inorganic or organic acid.

We claim:
1. A member of the group consisting of compounds having the formula

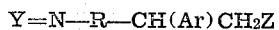

wherein Y=N— is a low molecular dialkylamino radical in which the alkyl groups may be joined to form a heterocyclic radical of the group consisting of piperidines and morpholines, R is an alkylene group having 2 to 7 atoms wherein the two free valences of said alkylene group are separated by at least two contiguous carbon atoms, Ar is a member of the group consisting of halophenyl, dihalophenyl, hydroxyphenyl and alkoxyphenyl and Z is a member of the group consisting of primary amino, guanido and ureido groups.

2. A compound having the formula

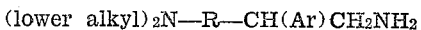

where R is an alkylene group having 2 to 7 carbon atoms wherein the two free valences of said alkylene group are separated by at least two carbon atoms and Ar is a halophenyl radical.

3. A compound having the formula

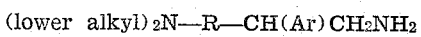

where R is an alkylene group having 2 to 7 carbon atoms wherein the two free valences of said alkylene group are separated by at least two carbon atoms and Ar is a dihalophenyl radical.

4. A compound having the formula

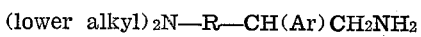

where R is an alkylene group having 2 to 7 carbon atoms wherein the two free valences of said alkylene group are separated by at least two carbon atoms and Ar is an alkoxyphenyl radical.

5. A compound having the formula

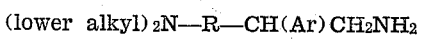

where R is an alkylene group having 2 to 7 carbon atoms wherein the two free valences of said alkylene group are separated by at least two carbon atoms and Ar is a hydroxyphenyl radical.

6. 4-diethylamino - 2 - (4-methoxyphenyl) butylamine.

7. 4-diethylamino - 2 - (4-hydroxyphenyl) butylamine.

8. 4-diethylamino - 2 - (4-cholophenyl) butylamine.

9. 4-diethylamino - 2 - (3,4-dichlorophenyl) - butylamine.

CHARLES EDWARD KWARTLER.
PHILIP LUCAS.

REFERENCES CITED

The following references are of record in the file of this patent:

FOREIGN PATENTS

| Number | Country | Date |
| --- | --- | --- |
| 13,600 | Great Britain | June 12, 1907 |
| 423,735 | Great Britain | Jan. 28, 1935 |
| 710,227 | Germany | Sept. 8, 1941 |

OTHER REFERENCES

Degering, "An Outline of Organic Nitrogen Cpds.", Univ. Lithoprinters, Ypsilanti, Mich., 1945, para. 1571.

Kleiderer et al., "P. B. 981" (Office of the Publication Board, Dept. of Commerce, Wash., D. C.), page 97, January 25, 1946.

Certificate of Correction

Patent No. 2,530,126                                                    November 14, 1950

CHARLES EDWARD KWARTLER ET AL.

It is hereby certified that error appears in the printed specification of the above numbered patent requiring correction as follows:

Column 2, line 21, for that portion of the equation reading $ArCh_2CN—B\rightarrow$      read      $ArCH_2CN\ -B\rightarrow$ column 3, line 55, before "Example" insert an opening parenthesis; column 4, line 47, for "1-(3-benzylophenyl)" read *1-(4-benzyloxyphenyl)*; column 6, line 50, for "(4-cholophenyl)" read *(4-chlorophenyl)*;

and that the said Letters Patent should be read as corrected above, so that the same may conform to the record of the case in the Patent Office.

Signed and sealed this 9th day of January, A. D. 1951.

[SEAL]

THOMAS F. MURPHY,
                                                    *Assistant Commissioner of Patents.*